United States Patent
Jin et al.

(10) Patent No.: US 12,260,216 B2
(45) Date of Patent: Mar. 25, 2025

(54) CONFLICT DETECTION METHOD AND SYSTEM FOR INTERNET OF THINGS (IoT) DEVICE SCHEDULING

(71) Applicants: Peking University, Beijing (CN); East China Normal University, Shanghai (CN)

(72) Inventors: Zhi Jin, Beijing (CN); Xiaohong Chen, Shanghai (CN); Han Bian, Shanghai (CN)

(73) Assignees: Peking University, Beijing (CN); East China Normal University, Shanghai (CN)

( * ) Notice: Subject to any disclaimer, the term of this patent is extended or adjusted under 35 U.S.C. 154(b) by 548 days.

(21) Appl. No.: 17/697,338

(22) Filed: Mar. 17, 2022

(65) Prior Publication Data

US 2022/0300287 A1 Sep. 22, 2022

(30) Foreign Application Priority Data

Mar. 18, 2021 (CN) .......................... 202110291182.2

(51) Int. Cl.
*G06F 9/30* (2018.01)
*G06F 8/41* (2018.01)
(Continued)

(52) U.S. Cl.
CPC .......... *G06F 9/30072* (2013.01); *G06F 8/433* (2013.01); *G06F 9/30058* (2013.01);
(Continued)

(58) Field of Classification Search
CPC .. G06F 9/30072; G06F 8/433; G06F 9/30058; G06F 9/4881; G06F 11/3608;
(Continued)

(56) References Cited

U.S. PATENT DOCUMENTS

| | | | | |
|---|---|---|---|---|
| 2020/0073739 | A1* | 3/2020 | Rungta | G06F 8/60 |
| 2020/0286016 | A1* | 9/2020 | Singh | H04W 4/70 |
| 2022/0067520 | A1* | 3/2022 | Dalli | G06N 20/00 |

FOREIGN PATENT DOCUMENTS

CN 106055318 A * 10/2016 ............... G06F 8/34

OTHER PUBLICATIONS

English translation of CN106055318A (Year: 2016).*
(Continued)

*Primary Examiner* — Kenneth Tang
(74) *Attorney, Agent, or Firm* — Dority & Manning, P.A.

(57) ABSTRACT

The present disclosure discloses a conflict detection method for Internet of Things (IoT) device scheduling, relating to the technical field of the IoT, and specific steps include: acquiring data of a device model; converting a device scheduling instruction into a conditional instruction according to the data of the device model; determining a scheduling conflict rule according to device scheduling conflicts in historical data; detecting whether the conditional instruction is in a conflict state based on the scheduling conflict rule; if the conditional instruction is in a conflict state, performing a first conflict resolution, or if the conditional instruction is in a non-conflict state or after a conflict is resolved, performing a second detection; converting, in the second detection, the conditional instruction into an SMT formula, inputting the SMT formula into an SMT solver for detection, and determining whether the conditional instruction is in a conflict state; and if the conditional instruction is in a conflict state, performing second conflict resolution, or if the conditional instruction is in a non-conflict state or after a conflict is resolved, executing the conditional instruction. The present disclosure ensures consistency between different services of the IoT, and a rule-based method and an SMT solver-based method are adopted to perform conflict detection.

7 Claims, 3 Drawing Sheets

(51) Int. Cl.
*G06F 9/48* (2006.01)
*G06F 11/3604* (2025.01)
*G06F 11/362* (2025.01)
*G06F 17/11* (2006.01)
*G06N 3/04* (2023.01)
*G06Q 50/00* (2012.01)
*H04L 41/08* (2022.01)
*G16Y 40/30* (2020.01)

(52) U.S. Cl.
CPC ........ *G06F 9/4881* (2013.01); *G06F 11/3608* (2013.01); *G06F 11/3632* (2013.01); *G06F 17/11* (2013.01); *G06N 3/04* (2013.01); *G06Q 50/00* (2013.01); *H04L 41/08* (2013.01); *G16Y 40/30* (2020.01)

(58) Field of Classification Search
CPC .. G06F 11/3632; G06F 17/11; G06F 11/0709; G06F 11/0736; G06F 11/0751; G06F 11/3612; G06F 9/44552; G06F 9/4843; G06Y 40/30
See application file for complete search history.

(56) References Cited

OTHER PUBLICATIONS

Ibrhim et al., "A conflicts' classification for IoT-based services: a comparative survey", PeerJ Computer Science, 2021, pp. 1-43. (Year: 2021).*

* cited by examiner

CONFLICT DETECTION METHOD AND SYSTEM FOR INTERNET OF THINGS (IoT) DEVICE SCHEDULING

CROSS REFERENCE TO RELATED APPLICATION(S)

This patent application claims the benefit and priority of Chinese Patent Application No. 202110291182.2, filed on Mar. 18, 2021, the disclosure of which is incorporated by reference herein in its entirety as part of the present application.

TECHNICAL FIELD

The present disclosure relates to the technical field of the Internet of Things (IoT), and specifically, to a conflict detection method and system for IoT device scheduling.

BACKGROUND ART

At present, various IoT systems are appearing on the market. These systems are controlled by event-driven intelligent applications which take sensing data, user input, or other external triggers from the Internet as inputs, and command one or more intelligent devices by using actuators to provide different forms of automation. Today, the quantity of interconnected intelligent devices is increasing dramatically, from 12.5 billion in 2010 to 50 billion this year. It is estimated that in 2025, the quantity of interconnected intelligent devices worldwide will reach 75.44 billion.

In response to this trend, various companies have begun to promote intelligent devices to ordinary consumers in the past few years, which creates momentum for pervasive computing in the mass market. Therefore, an idea of providing end users with tools to program the environment, which has been discussed in academic literature for a long time, is now becoming true for more people. In a form of "IF trigger, THEN action", such as "IF temperature exceeds 25 degrees Celsius, THEN turn on the air conditioner", trigger-action programming (TAP) is supported by many platforms, such as IFTTT, Homekit of Apple, and Alexa of Amazon.

Unfortunately, these platforms have not proposed measures to ensure consistency between different services of the IoT, and therefore, consistency issues are prone to occur. The consistency issues refer to a fact that a rule cannot occur, or the conflict occurs between two or more rules. For software systems, any errors caused by inconsistency may have consequences in the real world, and even threaten the property or life of a user. In an IoT system, when the TAP is used for user programming, users do not consider consistency issues, making these issues more prominent.

Therefore, how to provide a conflict detection method and system for IoT device scheduling to ensure consistency between different services of the IoT is an urgent problem that needs to be resolved for technicians of this field.

SUMMARY

In view of this, the present disclosure provides a conflict detection method and system for IoT device scheduling to ensure consistency between different services of the IoT. A rule-based method and an SMT solver-based method are adopted to perform conflict detection.

To achieve the above objective, the present disclosure provides the following technical solutions:

A conflict detection method for IoT device scheduling, where specific steps include:
acquiring data of a device model, where the device model includes a device automaton and a device registry;
converting a device scheduling instruction into a conditional instruction according to the data of the device model;
determining a scheduling conflict rule according to device scheduling conflicts in historical data;
detecting whether the conditional instruction is in a conflict state based on the scheduling conflict rule;
if the conditional instruction is in a conflict state, performing a first conflict resolution, or if the conditional instruction is in a non-conflict state or after a conflict is resolved, performing a second detection;
in the second detection, converting the conditional instruction into an SMT formula, inputting the SMT formula into an SMT solver for detection, and determining whether the conditional instruction is in a conflict state; and
if the conditional instruction is in a conflict state, performing a second conflict resolution, or if the conditional instruction is in a non-conflict state or after a conflict is resolved, executing the conditional instruction.

Preferably, in the above conflict detection method for IoT device scheduling, the specific step of converting a device scheduling instruction into a conditional instruction includes:
acquiring a to-be-executed operation statement of an IoT device from the device registry;
determining an API according to the to-be-executed operation statement;
determining a to-be-triggered state statement of the API by using the device automaton, and replacing the to-be-executed statement with the to-be-triggered state statement; and
obtaining the conditional instruction.

Preferably, in the above conflict detection method for IoT device scheduling, the scheduling conflict rule includes: at least three conflicts existing between two conditional instructions;
a result state conflict: the same trigger condition with different to-be-executed states;
a condition and result inversion conflict: transposition of trigger conditions and to-be-executed states of two conditional instructions; and
a state coverage conflict: a trigger condition of one conditional instruction covering a trigger condition range of the other conditional instruction with to-be-executed states being different.

Preferably, in the above conflict detection method for IoT device scheduling, the specific step of detecting whether the conditional instruction is in a conflict state based on the scheduling conflict rule is as follows:
for any two conditional instructions, firstly detecting whether trigger conditions are the same through text comparison; if the trigger conditions are the same, then detecting whether to-be-executed states are different states of a same device; and if the to-be-executed states are different states of the same device, indicating that the result state conflict occurs, returning true and outputting the conflicting conditional instructions;
secondly, detecting whether a trigger condition of one conditional instruction is a to-be-executed operation of the other conditional instruction, and whether the to-be-executed operation is a trigger condition of the other conditional instruction; and if both are true, indicating that the condition and result inversion conflict occurs, returning true and outputting the conflicting conditional instructions;

finally, detecting whether the trigger conditions of the two conditional instructions may occur at the same time; if possible, then detecting whether to-be-executed operations are different states of a same device; and if the to-be-executed operations are different states of the same device, indicating that the state coverage conflict occurs, returning true and outputting the conflicting conditional instructions; and if no conflict is found in the above three steps, indicating that no conflict is detected according to the rule, returning false, and ending an algorithm.

Preferably, in the above conflict detection method for IoT device scheduling, specific steps for the second detection are as follows:

converting a conditional instruction into an SMT formula, and inputting the SMT formula into an SMT solver; and outputting whether the SMT formula has a feasible solution, where SMT formulas corresponding to the trigger conditions of the two conditional instructions are written into the same file to solve the SMT formulas; and if there is no solution, the two trigger conditions may not occur at the same time, indicating that there is no conflict; or if there is a solution, the two trigger conditions may occur at the same time, indicating that a conflict may occur.

A conflict detection system for IoT device scheduling, including:

a data acquisition module, used for a user to acquire data of a device model, where the device model includes a device automaton and a device registry;

an instruction conversion module, used to convert a device scheduling instruction into a conditional instruction;

a scheduling conflict rule module, used to determine scheduling conflict rules according to device scheduling conflicts in historical data;

a first detection module, used to detect whether the conditional instructions are in conflict states based on the scheduling conflict rules; and a second detection module, used for an SMT solver to perform detection, and determine whether the conditional instructions are in conflict states.

Preferably, in the above conflict detection method for IoT device scheduling, the instruction conversion module includes a to-be-executed operation statement identification unit, a to-be-triggered state statement determining unit, a statement replacement unit, and a conditional instruction output unit, where the to-be-executed operation statement identification unit acquires a to-be-executed operation statement of an IoT device from the device registry; and determines an API according to the to-be-executed operation statement;

the to-be-triggered state statement determining unit determines a to-be-triggered state statement of the API by using the device automaton;

the statement replacement unit replaces the to-be-executed statements with the to-be-triggered state statement; and the conditional instruction output unit outputs the conditional instructions.

Preferably, in the above conflict detection method for IoT device scheduling, the first detection module includes: a result state conflict unit, a result inversion conflict unit, a state coverage conflict unit, and a conflict instruction output unit; for any two conditional instructions, the result state conflict unit detects whether trigger conditions are the same through text comparison; if the trigger conditions are the same, then detects whether to-be-executed states are different states of a same device; and if the to-be-executed states are different states of the same device, indicating that the result state conflict occurs, returns true and outputs the conflicting conditional instructions;

secondly, the result inversion conflict unit detects whether a trigger condition of one conditional instruction is a to-be-executed operation of the other conditional instruction, and whether the to-be-executed operation is a trigger condition of the other conditional instruction; and if both are true, indicating that the condition and result inversion conflict occurs, returns true and outputs the conflicting conditional instructions;

finally, the state coverage conflict unit first detects whether the trigger conditions of the two conditional instructions may occur at the same time, if possible, then detects whether to-be-executed operations are different states of a same device; and if the to-be-executed operations are different states of the same device, indicating that the state coverage conflict occurs, returns true and outputs the conflicting conditional instructions; and the conflict instruction output unit outputs the conflicting conditional instructions.

Preferably, in the above conflict detection method for IoT device scheduling, the second detection module includes an SMT formula conversion unit and an SMT solver; the SMT formula conversion unit converts a conditional instruction into an SMT formula, and inputs the SMT formula into the SMT solver; and the SMT solver outputs whether the SMT formula has a feasible solution.

It is known from the above technical solutions that, compared with the existing solutions, the present disclosure provides a conflict detection method and system for IoT device scheduling. Starting from numerical constraints to be met by the device and the scheduling, it is determined through historical data that there are conflicting rules in the device scheduling of the IoT, and conflict detection is performed based on the SMT solver-based method, so as to ensure the consistency among different services of the IoT.

BRIEF DESCRIPTION OF THE DRAWINGS

To describe the technical solutions in the embodiments of the present disclosure more clearly, the accompanying drawings required for describing the embodiments are briefly described. Apparently, the accompanying drawings in the following description show merely some embodiments of the present disclosure, and an ordinary technician of this field may still derive other drawings from these accompanying drawings without creative efforts.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by an ordinary technician of this field on the basis of the embodiments of the present disclosure without creative efforts shall fall within the protection scope of the present disclosure.

Figure 1:
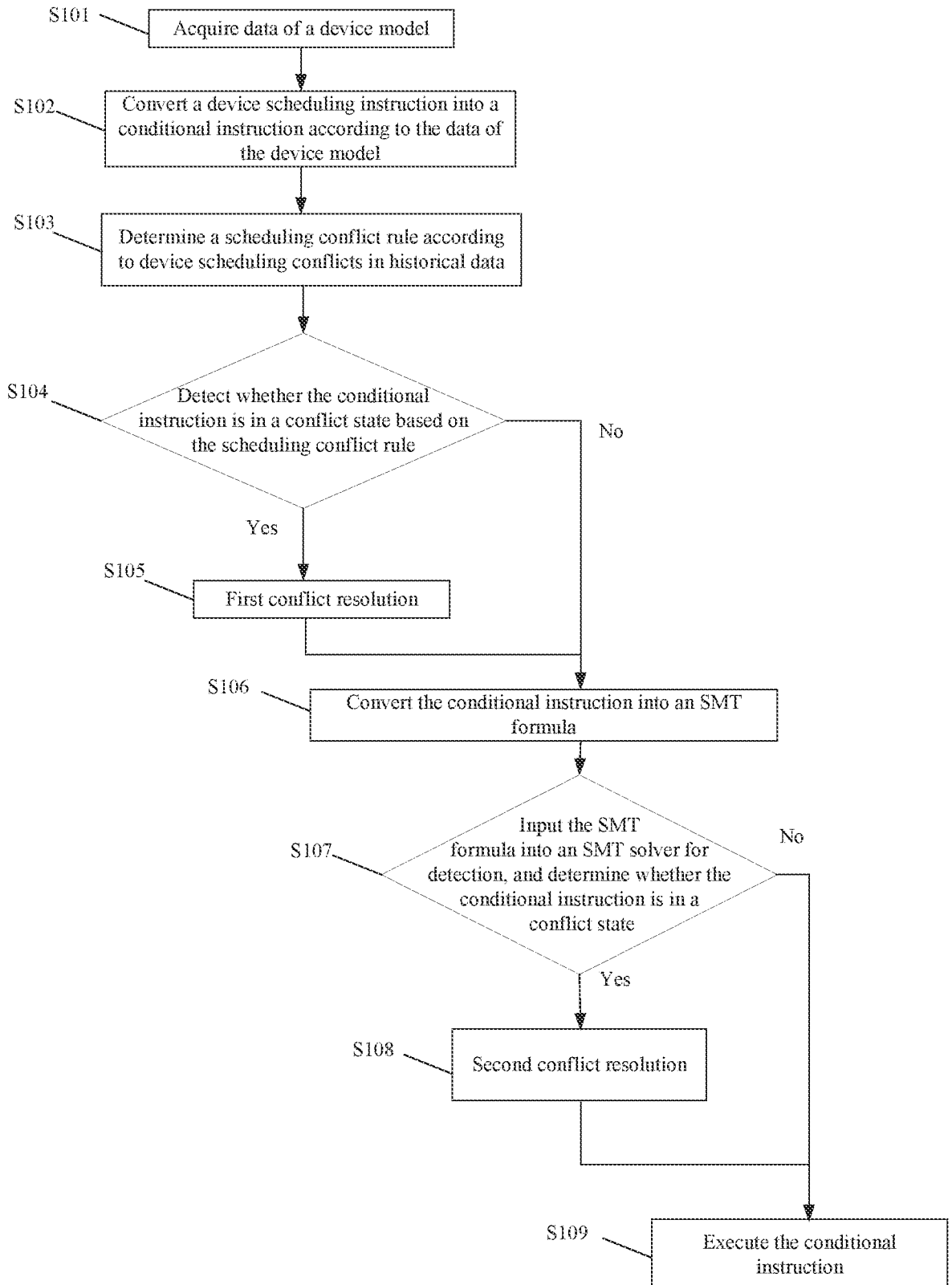
FIG. 1 is a flowchart for the method according to the present disclosure.

An embodiment of the present disclosure discloses a conflict detection method for IoT device scheduling, as shown in FIG. 1, specific steps include:

S101 Acquire data of a device model, where the device model includes a device automaton and a device registry.

S102 Convert a device scheduling instruction into a conditional instruction according to the data of the device model.

S103 Determine a scheduling conflict rule according to device scheduling conflicts in historical data.

S104 Detect whether the conditional instruction is in a conflict state based on the scheduling conflict rule.

S105 If the conditional instruction is in a conflict state, perform a first conflict resolution.

S106 Convert the conditional instruction into an SMT formula.

S107 Input the SMT formula into an SMT solver for detection, and determine whether the conditional instruction is in a conflict state.

S108 If the conditional instruction is in a conflict state, perform a second conflict resolution.

S109 Execute the conditional instruction.

Figure 2:
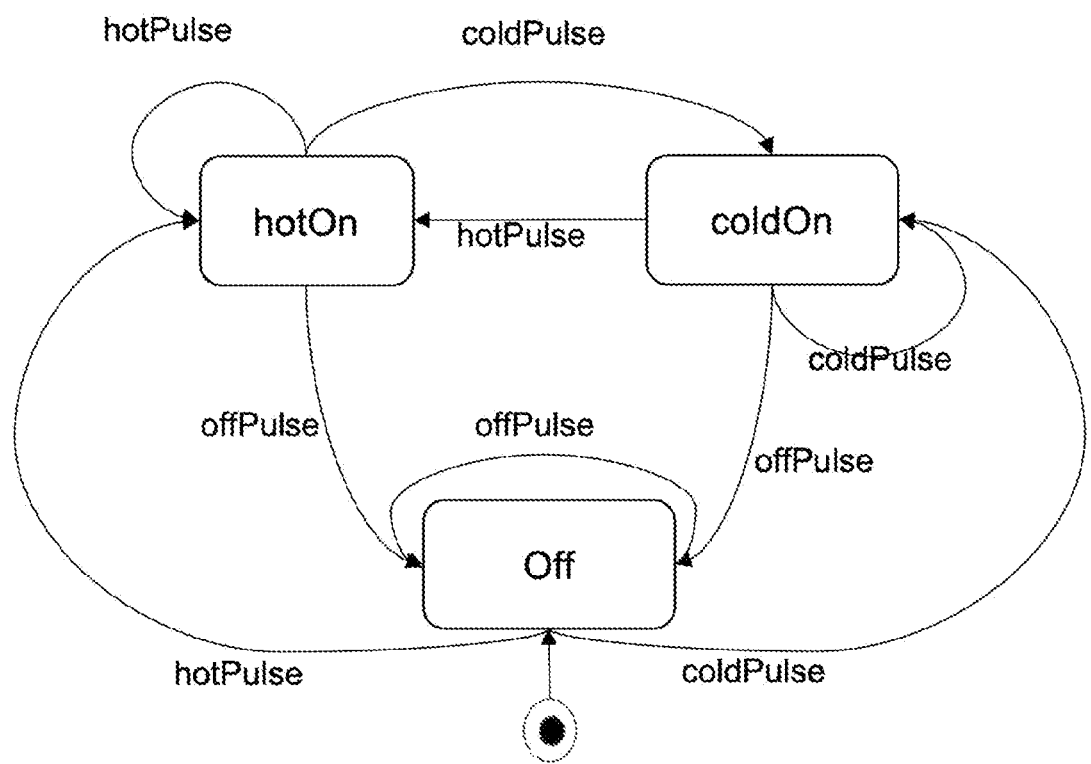
FIG. 2 is a schematic diagram of an air conditioning automaton according to an embodiment of the present disclosure.
Figure 3:
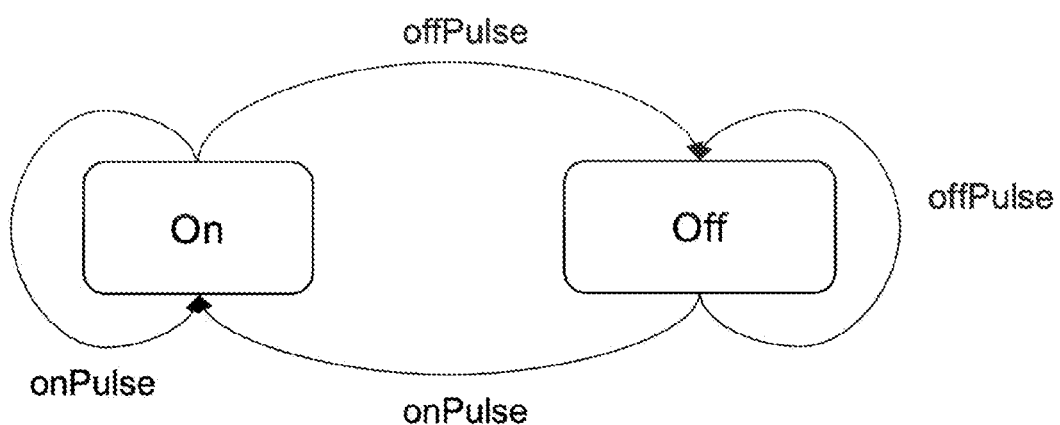
FIG. 3 is a schematic diagram of a lamp automaton according to an embodiment of the present disclosure.

In order to further optimize the above technical solution, in S101 acquiring data of a device model, the data of the device model includes the device automaton and the device registry. The device automaton is a state diagram describing states of the device and events that trigger these states. For example, a state machine of an air conditioner, as shown in FIG. 2 and FIG. 3. When the air conditioner is in an off state, it indicates that the air conditioner is off. If an offPulse event is received at this time, the air conditioner continues to be off, and if a coldPulse event is received, the air conditioner is set to be in a coldOn state, or if a hotPulse event is received, the air conditioner is changed to be in a hotOn state.

Furthermore, for a lamp, there are two states; an on state and an off state. When an onPulse is received, the lamp is set to the on state, and when an off pulse is received, the lamp is set to the off state. The air conditioner has three states: hotOn, coldOn, and off. When hotPulse and coldPulse are received, the air conditioner is set to the hotOn state and the coldOn state respectively, and when an off pulse is received, the air conditioner is turned off.

Furthermore, the device registry is provided by a manufacturer of the device, and the device registry mainly includes a device type, a device state, an API corresponding to the state, a function corresponding to the state (namely, a corresponding device scheduling instruction), and effects that the state may produce. An example of the device registry is shown in Table 1, including APIs for coldOn or hotOn of an air conditioner: coldPulse and hotPulse.

An on state of a lamp is taken as an example. A corresponding API is an onPulse, and a corresponding function is to turn on the lamp, resulting in light intensity to increase.

TABLE 1

| Device type | Device state | API corresponding to the state | State function | State effect |
| --- | --- | --- | --- | --- |
| Air conditioner 1 | hotOn | hotPulse | Turn on the air conditioner 1 for hotOn | Increasing temperature |
| Air conditioner 2 | coldOn | coldPulse | Turn on the air conditioner 2 for coldOn | Decreaseing temperature |
| Lamp 1 | On | onPulse | Turn on the lamp 1 | Increasing light intensity |
| Lamp 2 | Off | offPulse | Turn on the lamp 2 | Decreasing light intensity |
| ... | ... | ... | ... | ... |

In order to further optimize the above technical solution, the specific step of S102 converting a device scheduling instruction into a conditional instruction include:

acquiring a to-be-executed operation statement of an IoT device from the device registry;

determining an API according to the to-be-executed operation statement;

determining a to-be-triggered state statement of the API by using the device automaton; replacing the to-be-executed statement with the to-be-triggered state statement; and obtaining the conditional instruction.

Furthermore, S102 converting a device scheduling instruction into a conditional instruction "IF trigger THEN state" according to the data of the device model includes:

For a device scheduling conflict in a form of "IF trigger THEN action", if IF air.temperature>30 THEN turn on air conditioner cold, namely, if a temperature is greater than 30° C., the air conditioner is turned on. Firstly, find a corresponding API according to a to-be-executed operation statement action from the device registry, for example, find coldPulse according to turn on air conditionercold. Then find a to-be-triggered state statement of the API according to the API in a state diagram, and replace the original to-be-executed operation statement action with the to-be-triggered state statement, so as to complete the replacement. For example, coldPulse may enable the air conditioner to enter a coldOn state, then the TAP may be converted into IF air.temperature>30 THEN airconditioner.coldOn.

In order to further optimize the above technical solution, the scheduling conflict rule in S103 includes: at least three conflicts existing between two conditional instructions.

A result state conflict: a same trigger condition with different to-be-executed states.

A condition after IF of two conditional instructions is a same device state, but results after THEN are different states of a same entity, resulting in a statement conflict. For example, a statement obtaining by converting a TAP rule written by a user of an intelligent housing system is IF window.wclosed THEN airconditioner.hotOn and IF window.wclosed THEN airconditioner.coldOn. Therefore, when a window is closed, the air conditioner may be in both coldOn and hotOn states, which is obviously conflicting.

A condition and result inversion conflict: transposition of trigger conditions and to-be-executed states of two conditional instructions.

Two statements such as IF a THEN b and IF b THEN a appear at the same time. Sub-statements of IF and THEN are transposed, which causes loops of a and b to be triggered continuously and then end immediately, resulting in a conflict.

A state coverage conflict: a trigger condition of one conditional instruction covering a trigger condition range of the other conditional instruction with to-be-executed states being different.

Devices in the two statements are the same but the states are different, so different conditions that may occur at the same time cause a state to be executed later to overwrite a state to be executed first. For example, one statement requires the lamp to be off when the window is open, and the other statement requires the lamp to be on when a curtain is closed. If the curtain is closed when the window is open, then the lamp should be on according to the second statement. In this case, a lamp-on state overwrites a lamp-off state. In fact, the window is still open at this time, and the lamp should be off according to the first statement, which results in the state coverage conflict.

In order to further optimize the above technical solution, the specific step of S104 detecting whether the conditional instruction is in a conflict state based on the scheduling conflict rule is as follows:

for any two conditional instructions, firstly detecting whether trigger conditions are the same through text comparison; if the trigger conditions are the same, then detecting whether to-be-executed states are different states of a same device; and if the to-be-executed states are different states of the same device, indicating that the result state conflict occurs, returning true and outputting the conflicting conditional instructions;

secondly, detecting whether a trigger condition of one conditional instruction is a to-be-executed operation of the other conditional instruction, and whether the to-be-executed operation is a trigger condition of the other conditional instruction; and if both are true, indicating that the condition and result inversion conflict occurs, returning true and outputting the conflicting conditional instructions;

finally, detecting whether the trigger conditions of the two conditional instructions may occur at the same time, if possible, then detecting whether to-be-executed operations are different states of a same device; and if the to-be-executed operations are different states of the same device, indicating that the state coverage conflict occurs, returning true and outputting the conflicting conditional instructions; and if no conflict is found in the above three steps, indicating that no conflict is detected according to the rule, returning false, and ending an algorithm.

Furthermore, for different types of conflicts, the embodiments of the present disclosure provide different conflict resolution suggestions:

For the result state conflict, the user is prompted to send information to a user terminal: IF of the two statements are the same, but the results THEN involve different states of the same entity, and only one statement can be selected.

For the condition and result inversion conflict, the user is prompted to send information to the user terminal: the two statements may form a loop, only one of the two statements can be left, and the user is asked to make a choice.

For the state coverage conflict, the user is prompted to send information to the user terminal: conditions of the two statements may occur at the same time, but the results THEN involve different states of the same entity, and only one statement can be selected.

In order to further optimize the above technical solution, specific steps for S106 the second detection are as follows:

converting a conditional instruction into an SMT formula, and inputting the SMT formula into an SMT solver; and outputting whether the SMT formula has a feasible solution, where SMT formulas corresponding to the trigger conditions of the two conditional instructions are written into the same file to solve the SMT formulas; and if there is no solution, the two trigger conditions may not occur at the same time, indicating that there may be no conflict; or if there is a solution, the two trigger conditions may occur at the same time, indicating that a conflict may occur.

What needs to be understood is that the SMT formula includes declaration and assertion; the declaration refers to initialization of parameters, which is expressed as a statement of "(declare-const x type)", where x is a name of a parameter and type is a type of the parameter, and the embodiments of the present disclosure only involve an integer type Int and a real number type Real; the assertion refers to asserting that a specific logical expression is true, expressed as "(assertlogic-expression)", where logic-expression is a logical expression, and the logical expression is given as a prefix, such as "<a3" represents "a<3". An SMT formula including a set of declarations and assertions represents solving a value of a declaration parameter, such that all the assertions are established.

Statements detected based on rules may have numerical conflicts, namely, conditions of two statements include a value range of an attribute, and results are different states of the same device. If these two conditions may occur at the same time, the device may be in different states at the same time, thus resulting in a conflict. Therefore, for two statements detected based on rules, if results are different states of the same device, it is necessary to detect, based on the SMT, whether conditions thereof may occur at the same time. Firstly, the conditions are transformed into SMT formulas, and two different trigger conditions are transformed separately:

A value range of an attribute: for this type of trigger, only a syntax supported by z3 is required to name a constant, and then a range thereof is asserted. If a temperature is greater than 30 degrees Celsius, firstly, a constant temperature is named, and an SMT declaration statement "(declare-const air.temperature Real)" is added to indicate that the temperature is a constant of real number type, and then a range thereof is asserted, namely, an SMT assertion statement "(assert(>air.temperature 30))" is added to indicate that the temperature needs to be greater than 30.

A device state: compared with the value range of the attribute, the device state does not have a clear value, and therefore, manual assignment is required. For each device involved in trigger, firstly, a variable is declared in the SMT formula. Since the state of the device is discrete, the constant is in an integer type. For example, for the device of a window, only the SMT statement "(declare-constwindow Int)" is required to be added for declaration. Then, different integers starting from 0 are assigned to each state of the device involved in trigger. If the window is open, a value of 0 is assigned to the open state, namely, an SMT assertion statement "(assert(=window 0))" is added, or if the window is closed, a value of 1 is assigned to the closed state, namely, an SMT assertion statement "(assert(=window 1))" is added.

If trigger conditions are connected by a keyword of AND, each sub-condition is converted into a simultaneous SMT formula according to the above method.

Specifically, conditional instructions detected based on rules are converted into SMT formulas.

The conditional instructions detected based on rules are "IF light.brightness<500THEN bulb.bon", "IF projector.pon THEN bulb.boff" "IF air.temperature<27 THEN AC.off", and "IF air.temperature>26 THEN AC.colding", and conditions thereof are converted into SMT formulas:

A condition of a statement of "IF light.brightness<500 THEN bulb.bon": is Light.brightness<500, a related SMT declaration statement is "(declare-const light.brightness Real)", and a related SMT assertion statement is "(assert (<500 light.brightness))".

A condition of a statement of "IF projector.pon THEN bulb.boff": is projector.pon, a related SMT declaration statement is "(declare-constprojectorInt)", and a related SMT assertion statement is "(assert(=0projector))".

A condition of a statement of "IF air.temperature<27 THEN AC.off": is air.temperature<27, a related SMT declaration statement is "(declare-const air.temperature Real)", and a related SMT assertion statement is "(assert(<27air.temperature))".

A condition of a statement of "IF air.temperature>26 THEN AC.colding": is air.temperature>26, a related SMT declaration statement is "(declare-const air.temperature Real)", and a related SMT assertion statement is "(assert (>26air.temperature))".

The SMT formula is input into the SMT solver Z3 (an open-source tool provided by Microsoft Research) for conflict detection:

Among the four statements, results of the first statement and the second statement, and results of the third statement and the fourth statement are to agree with different states of the device. Therefore, conditions of the first statement and the second statement are converted into SMT formulas, in which Z3 is input, and then conditions of the third statement and the fourth statement are converted into SMT formulas, in which Z3 is input. Results are all sat, indicating that these conditions may occur at the same time. Therefore, the first statement and the second statement may conflict, and the third statement and the fourth statement may also conflict.

Resolution solutions are provided for conflicts detected by the SMT solver Z3.

The conditions of the first statement and the second statement are respectively a value range of light.brightness and a state of pon of projector, and therefore, a conflict thereof is a time constraint conflict, and only the user can provide priority. The user thinks that a priority of "IF projector.pon THEN bulb.boff" is 0, and a priority of "IF light.brightness<500 THEN bulb.bon" is 1, and therefore, if a light intensity is lower than 500 and the projector is turned on, the first statement may be executed first, and the lamp may be turned off.

Both the condition of the third statement and the condition of the fourth statement are value ranges of air.temperature, and inequality signs are > and <, which therefore belongs to a value conflict of attributes. This apparatus automatically resolves the conflict and changes the third statement to "IF air.temperature<26 THEN AC. off", thus avoiding the conflict.

Figure 4:
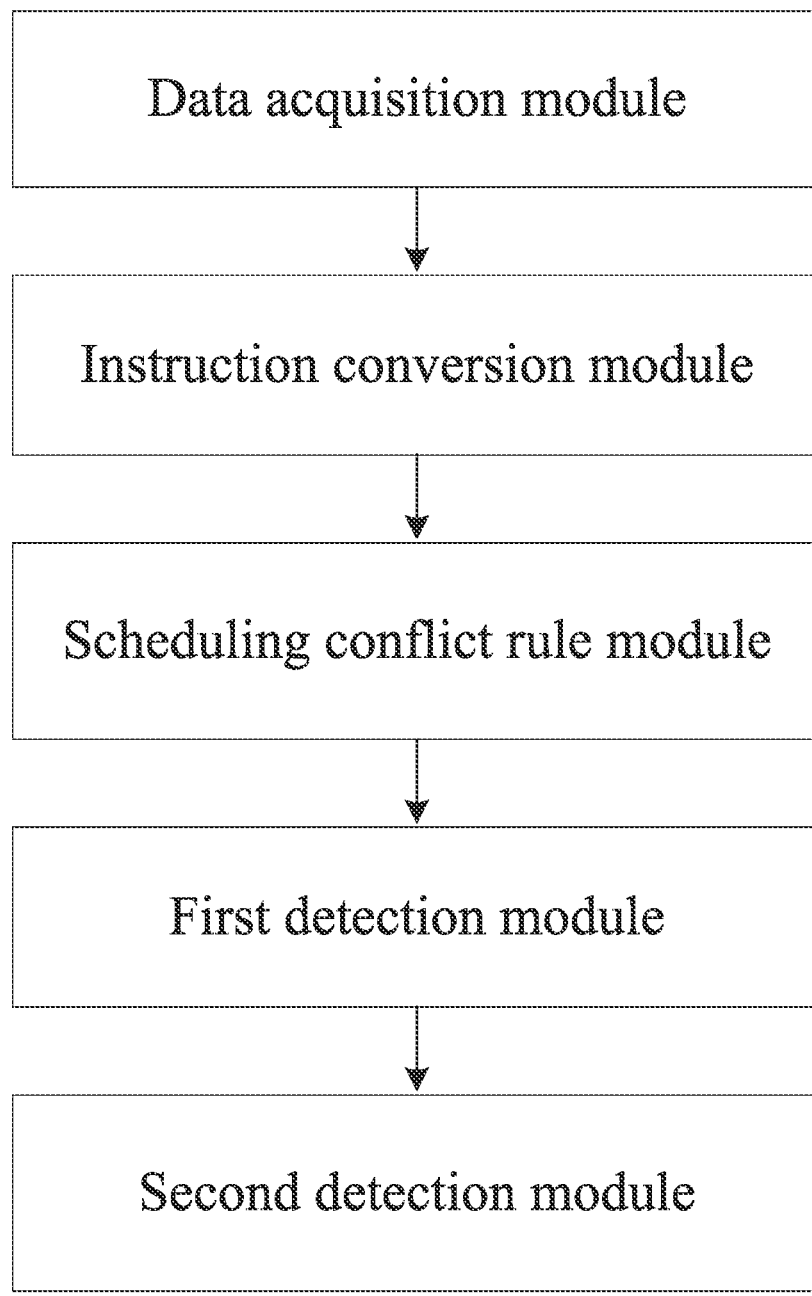
FIG. 4 is a system module diagram of the present disclosure.

Another embodiment of the present disclosure discloses a conflict detection system for IoT device scheduling, as shown in FIG. 4, the system includes:

a data acquisition module, configured for a user to acquire data of a device model, where the device model includes a device automaton and a device registry;

an instruction conversion module, used to convert a device scheduling instruction into a conditional instruction;

a scheduling conflict rule module, used to determine a scheduling conflict rule according to device scheduling conflicts in historical data;

a first detection module, used to detect whether the conditional instruction is in a conflict state based on the scheduling conflict rule; and a second detection module, used for an SMT solver for detection, and determining whether the conditional instruction is in a conflict state.

In order to further optimize the above technical solution, the instruction conversion module includes a to-be-executed operation statement identification unit, a to-be-triggered state statement determining unit, a statement replacement unit, and a conditional instruction output unit, where the to-be-executed operation statement identification unit acquires a to-be-executed operation statement of an IoT device from the device registry; and determines an API according to the to-be-executed operation statement;

the to-be-triggered state statement determining unit determines a to-be-triggered state statement of the API by using the device automaton;

the statement replacement unit replaces the to-be-executed statement with the to-be-triggered state statement; and the conditional instruction output unit outputs the conditional instruction.

In order to further optimize the above technical solution, the first detection module includes: a result state conflict unit, a result inversion conflict unit, a state coverage conflict unit, and a conflict instruction output unit; for any two conditional instructions, the result state conflict unit detects whether trigger conditions are the same through text comparison; if the trigger conditions are the same, then detects whether to-be-executed states are different states of a same device; and if the to-be-executed states are different states of the same device, indicating that the result state conflict occurs, returns true and outputs the conflicting conditional instructions;

secondly, the result inversion conflict unit detects whether a trigger condition of one conditional instruction is a to-be-executed operation of the other conditional instruction, and whether the to-be-executed operation is a trigger condition of the other conditional instruction, if the both are true, indicating that the condition and result inversion conflict occurs, returns true and outputs the conflicting conditional instructions;

finally, the state coverage conflict unit firstly detects whether the trigger conditions of the two conditional instructions may occur at the same time, if possible, then detects whether to-be-executed operations are different states of a same device; and if the to-be-executed operations are different states of the same device, indicating that the state coverage conflict occurs, returns true and outputs the conflicting conditional instructions; and the conflict instruction output unit outputs the conflicting conditional instructions.

In order to further optimize the above technical solution, the second detection module includes an SMT formula conversion unit and an SMT solver; the SMT formula conversion unit converts a conditional instruction into an SMT formula, and inputs the SMT formula into the SMT solver; and the SMT solver outputs whether the SMT formula has a feasible solution.

Each example of the present specification is described in a progressive manner, each example focuses on the difference from other examples, and the same and similar parts between the examples may refer to each other. Since a device disclosed in the embodiments corresponds to a method disclosed in the embodiments, its description is relatively simple, and relevant contents may be seen from partial description of the method.

The above description of the disclosed embodiments enables technicians of this field to achieve or use the present disclosure. Various modifications to these examples are readily apparent to a technician of this field, and the generic principles defined herein may be practiced in other examples without departing from the spirit or scope of the present disclosure. Thus, the present disclosure is not limited to the examples shown herein but falls within the widest scope consistent with the principles and novel features disclosed herein.

What is claimed is:

1. A conflict detection method for Internet of Things (IoT) device scheduling, wherein specific steps comprise:
    acquiring data of a device model, wherein the device model comprises a device automaton and a device registry;
    converting a device scheduling instruction into a conditional instruction according to the data of the device model;
    determining a scheduling conflict rule according to device scheduling conflicts in historical data;
    detecting whether the conditional instruction is in a conflict state based on the scheduling conflict rule;
    if the conditional instruction is in a conflict state, performing a first conflict resolution, or if the conditional instruction is in a non-conflict state or after a conflict is resolved, performing a second detection;
    converting, in the second detection, the conditional instruction into an SMT formula, inputting the SMT formula into an SMT solver for detection, and determining whether the conditional instruction is in a conflict state; and
    if the conditional instruction is in a conflict state, performing a second conflict resolution, or if the conditional instruction is in a non-conflict state or after a conflict is resolved, executing the conditional instruction;
    wherein the scheduling conflict rule comprises: at least three conflicts existing between two conditional instructions:
    a result state conflict: a same trigger condition with different to-be-executed states;
    a condition and result inversion conflict: transposition of trigger conditions and to-be-executed states of two conditional instructions; and
    a state coverage conflict: a trigger condition of one conditional instruction covering a trigger condition range of the other conditional instruction, with to-be-executed states being different.

2. The conflict detection method for IoT device scheduling according to claim 1, wherein the specific step of converting a device scheduling instruction into a conditional instruction comprises:
    acquiring a to-be-executed operation statement of an IoT device from the device registry;
    determining an API according to the to-be-executed operation statement;
    determining a to-be-triggered state statement of the API by using the device automaton, and replacing the to-be-executed statement with the to-be-triggered state statement; and
    obtaining the conditional instruction.

3. The conflict detection method for IoT device scheduling according to claim 1, wherein the specific step of detecting whether the conditional instruction is in a conflict state based on the scheduling conflict rule is as follows:
    for any two conditional instructions, firstly detecting whether trigger conditions are the same through text comparison; if the trigger conditions are the same, then detecting whether to-be-executed states are different states of a same device; and if the to-be-executed states are different states of the same device, indicating that the result state conflict occurs, returning true and outputting the conflicting conditional instructions;
    secondly, detecting whether a trigger condition of one conditional instruction is a to-be-executed operation of the other conditional instruction, and whether the to-be-executed operation is a trigger condition of the other conditional instruction; and if both are true, indicating that the condition and result inversion conflict occurs, returning true and outputting the conflicting conditional instructions;
    finally, detecting whether the trigger conditions of the two conditional instructions may occur at the same time; if possible, then detecting whether to-be-executed operations are different states of a same device; and if the to-be-executed operations are different states of the same device, indicating that the state coverage conflict occurs, returning true and outputting the conflicting conditional instructions; and
    if no conflict is found in the above three steps, indicating that no conflict is detected according to the rule, returning false, and ending an algorithm.

4. The conflict detection method for IoT device scheduling according to claim 1, wherein specific steps for the second detection are as follows:
    converting a conditional instruction into an SMT formula, and inputting the SMT formula into an SMT solver; and
    outputting whether the SMT formula has a feasible solution, wherein SMT formulas corresponding to the trigger conditions of the two conditional instructions are written into a same file to solve the SMT formulas; and
    if there is no solution, the two trigger conditions may not occur at the same time, indicating that there is no conflict; or if there is a solution, the two trigger conditions may occur at the same time, indicating that a conflict may occur.

5. A conflict detection system for IoT device scheduling, comprising:
    a data acquisition module, used for a user to acquire data of a device model, wherein the device model comprises a device automaton and a device registry; an instruction conversion module, configured to convert a device scheduling instruction into a conditional instruction;
    a scheduling conflict rule module, used to determine a scheduling conflict rule according to device scheduling conflicts in historical data;
    a first detection module, used to detect whether the conditional instruction is in a conflict state based on the scheduling conflict rule; and
    a second detection module, used for an SMT solver to perform detection, and determine whether the conditional instruction is in a conflict state;

wherein the first detection module comprises: a result state conflict unit, a result inversion conflict unit, a state coverage conflict unit, and a conflict instruction output unit; for any two conditional instructions, the result state conflict unit detects whether trigger conditions are the same through text comparison; if the trigger conditions are the same, then detect whether to-be-executed states are different states of a same device; and if the to-be-executed states are different states of the same device, indicating that the result state conflict occurs, returns true and outputs the conflicting conditional instructions;

secondly, the result inversion conflict unit detects whether a trigger condition of one conditional instruction is a to-be-executed operation of the other conditional instruction, and whether the to-be-executed operation is a trigger condition of the other conditional instruction; and if both are true, indicating that the condition and result inversion conflict occurs, returns true and outputs the conflicting conditional instructions;

finally, the state coverage conflict unit first detects whether the trigger conditions of the two conditional instructions may occur at the same time; if possible, then detects whether to-be-executed operations are different states of a same device; and if the to-be-executed operations are different states of the same device, indicating that the state coverage conflict occurs, returns true and outputs the conflicting conditional instructions; and the conflict instruction output unit outputs the conflicting conditional instructions.

6. The conflict detection system for IoT device scheduling according to claim 5, wherein the instruction conversion module comprises a to-be-executed operation statement identification unit, a to-be-triggered state statement determining unit, a statement replacement unit, and a conditional instruction output unit, wherein the to-be-executed operation statement identification unit acquires a to-be-executed operation statement of an IoT device from the device registry; and determines an API according to the to-be-executed operation statement;

the to-be-triggered state statement determining unit determines a to-be-triggered state statement of the API by using the device automaton;

the statement replacement unit replaces the to-be-executed statement with the to-be-triggered state statement; and the conditional instruction output unit outputs the conditional instruction.

7. The conflict detection system for IoT device scheduling according to claim 5, wherein the second detection module comprises an SMT formula conversion unit and an SMT solver; the SMT formula conversion unit converts a conditional instruction into an SMT formula, and inputs the SMT formula into the SMT solver; and the SMT solver outputs whether the SMT formula has a feasible solution.

* * * * *